April 15, 1969  C. K. KITE ET AL  3,438,642
WHIRLABLE VEHICLE
Filed Feb. 24, 1967  Sheet _1_ of 3
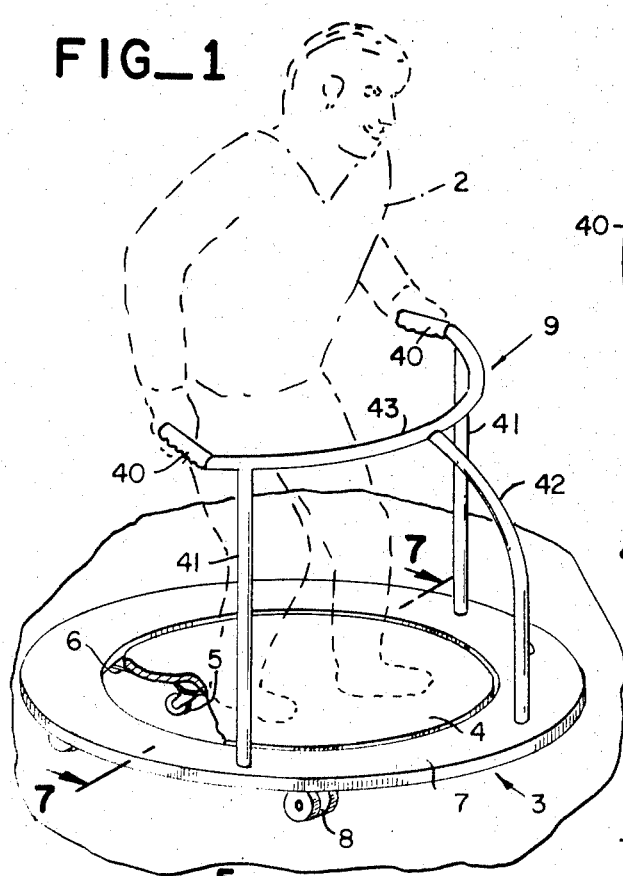
FIG_1
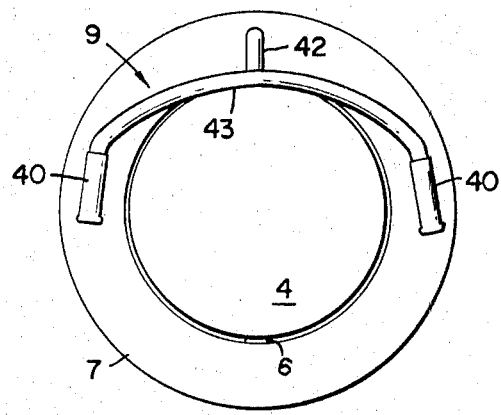
FIG_2
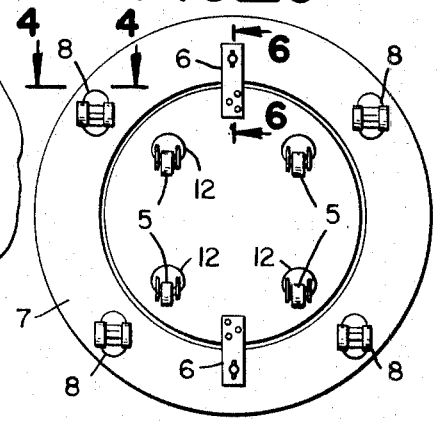
FIG_3
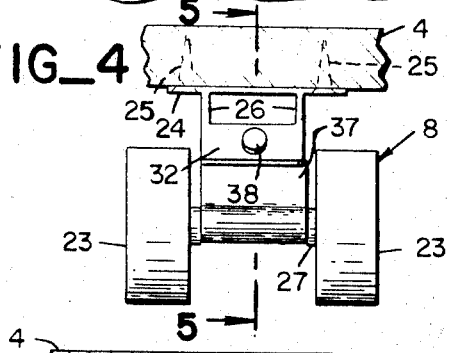
FIG_4
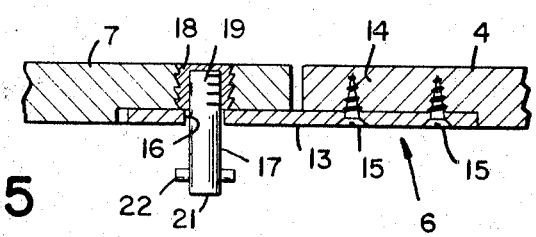
FIG_6
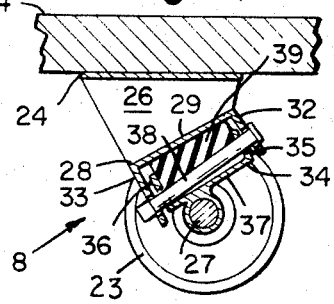
FIG_5
INVENTORS
C. KENNETH KITE
BY ELIO J. PULEO
Boyken, Mohler, Foster & Schlemmer
ATTORNEYS

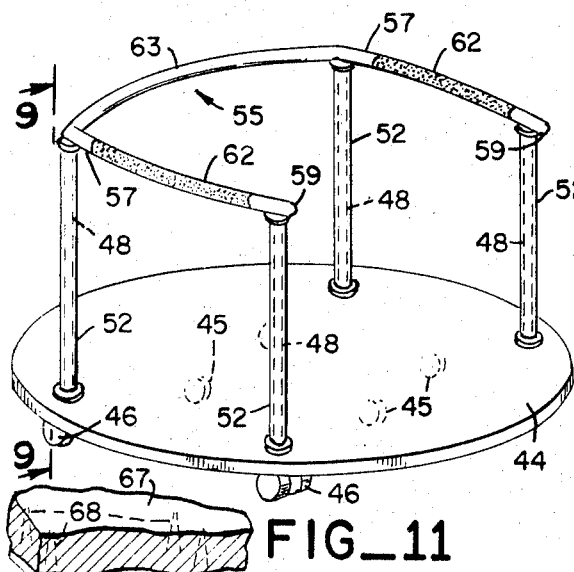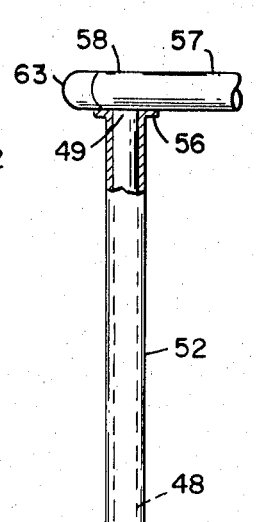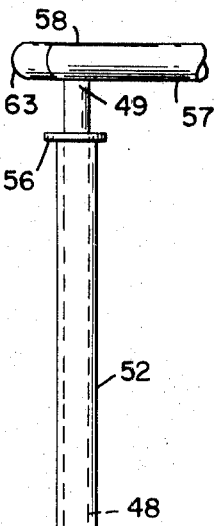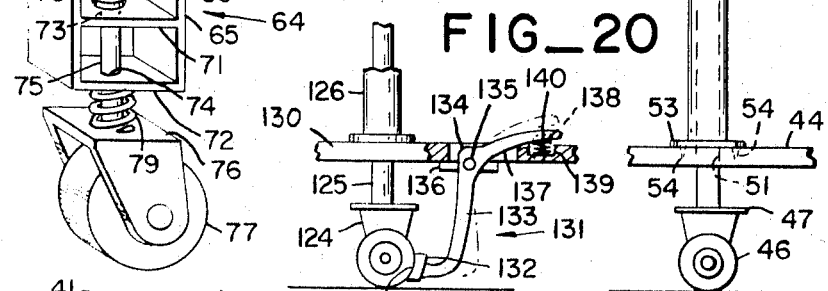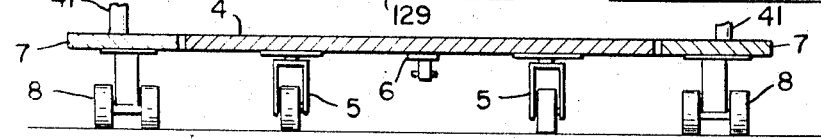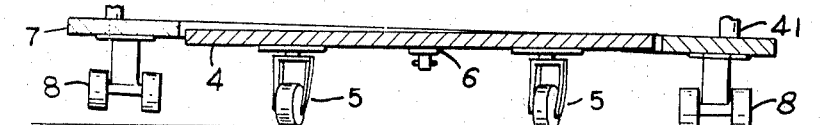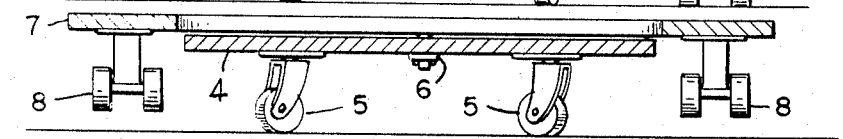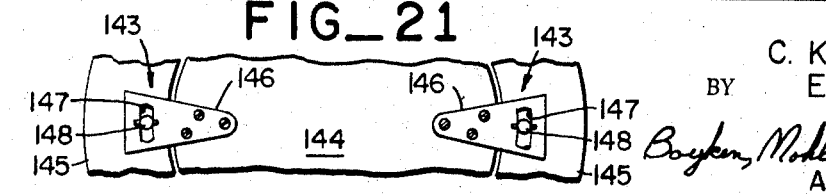

April 15, 1969  C. K. KITE ET AL  3,438,642
WHIRLABLE VEHICLE
Filed Feb. 24, 1967  Sheet 3 of 3
FIG_12
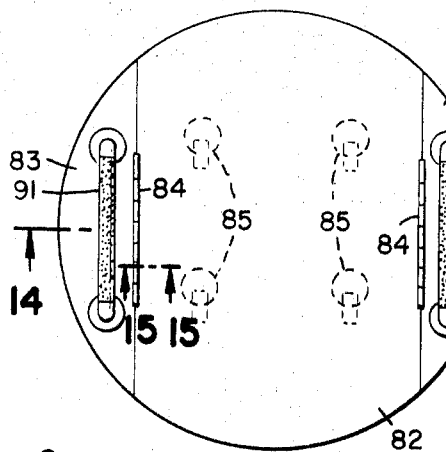
FIG_13
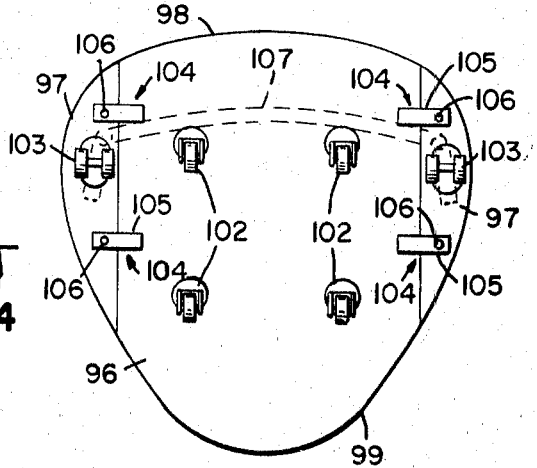
FIG_14A
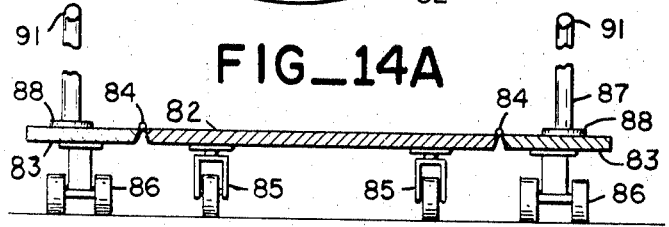
FIG_18
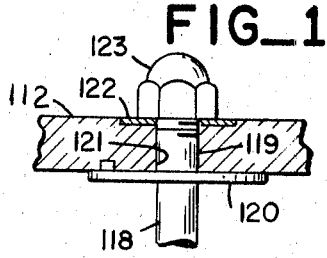
FIG_14B
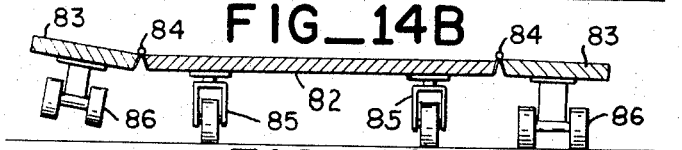
FIG_14C
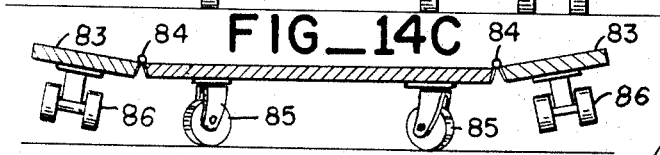
FIG_17
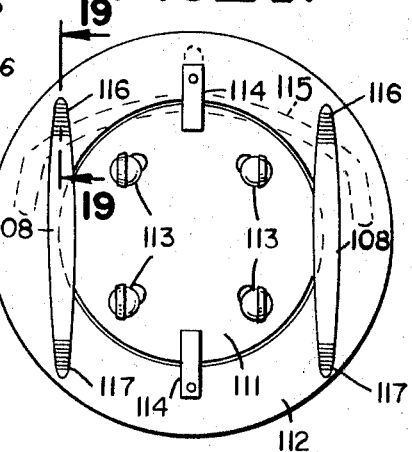
FIG_15
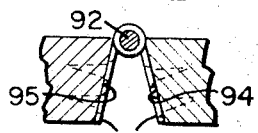
FIG_16
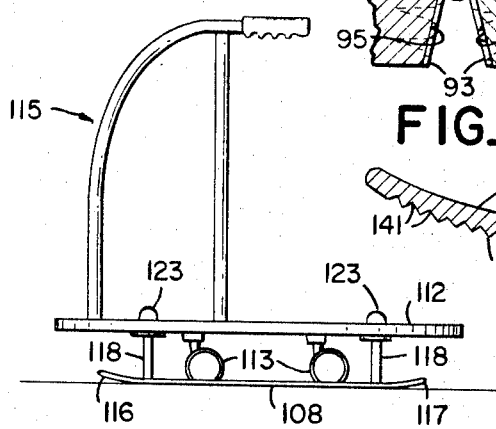
FIG_19
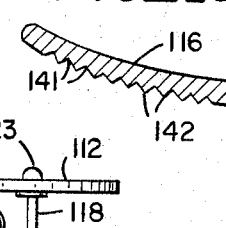
INVENTORS
C. KENNETH KITE
BY  ELIO J. PULEO
Boyken, Mohler, Foster & Schleman
ATTORNEYS

United States Patent Office 3,438,642
Patented Apr. 15, 1969

3,438,642
WHIRLABLE VEHICLE
Charles Kenneth Kite and Elio J. Puleo, Indianapolis, Ind., assignors to C. K. Kite, E. J. Puleo, A. E. Kite, Jr., A. C. Conde, and J. A. Whitehead, doing business as Unique Associates, Indianapolis, Ind.
Filed Feb. 24, 1967, Ser. No. 618,483
Int. Cl. A63g 13/00; B62b 3/00
U.S. Cl. 280—8                                13 Claims

ABSTRACT OF THE DISCLOSURE

A rotatable amusement vehicle having a base supported for movement along a vehicle supporting surface and for rotation about a vertical axis. The base is adapted to carry a vehicle operator, and vehicle controls are provided which are operable by the operator while the vehicle base is so moving, for causing the base to rotate about a generally vertical central axis.

---

This invention relates generally to amusement vehicles, and more particularly to a vehicle which is adapted to be propelled along a desired straight or curved path, and while travelling along such path, caused by an operator thereon to enter into a rapid spinning or whirling motion for whirling the operator therewith. As hereinafter employed with reference to the vehicle of this invention, the terms "spin" and "whirl" refer to rotation about a vertical central axis.

This vehicle includes a footboard or platform, which is mounted by an operator after the vehicle has been propelled to the desired velocity by the operator pushing from behind or pushing with one foot with the other foot on the footboard. Controls are provided on the vehicle which are adapted to be manipulated by the operator while the vehicle is travelling, to cause the platform to initiate a whirl, and further manipulated to sustain such whirl. The whirling motion can be terminated by the operator with the control means for causing the vehicle to continue to travel without whirling.

Conventional foot propelled vehicles of this general type, such as the scooter, can be propelled in a straight line path, turned and guided in a curved path, but cannot be spun or whirled. Another related form of conventional foot propelled device is the skate board, which is usable to carry a rider for performing numerous stunts involving twists and sharp turns, but which cannot be made by the rider to continuously whirl or spin. Common foot propelled devices that are capable of whirling, such as the children's playground device known as the merry-go-round, must be whirled before the device is mounted or by someone other than the rider. Such device does not provide a spinning ride, and, of course, is fixed to one location at its central post.

The vehicle hereinafter described may be utilized as a child's toy on which the child can obtain an exhilarating spinning ride and perform stunts involving spinning motions. It may also be constructed of sufficient size to accommodate an adult, who can operate it solely for amusement or, since operation requires manipulation of controls during whirling, for developing and sharpening balance and coordination. The whirlable vehicle is operable on virtually any surface and can be specifically adapted for operation on ice.

It is, therefore, a principal object of this invention to provide a novel amusement vehicle giving a whirling ride.

Another object of the invention is the provision of a vehicle which, while such vehicle is travelling along a straight or curved path, may be caused by a rider thereon to whirl or spin for whirling the rider therewith.

A further object of the invention is the provision of a vehicle having controls which are operable by a rider to cause such vehicle and himself to enter into a whirling motion and to terminate such motion as desired.

An additional object of the invention is the provision of a vehicle giving a whirling ride and including interchangable means alternately adaptng such vehicle for operation on ice or on other surfaces.

This invention possesses other objects and features or advantage, which with the foregoing will be set forth in the following description of preferred forms of the invention which are illustrated in the drawings accompanying and forming a part of this specification. It is to be understood, however, that variations in the showing made by said drawings and description may be adopted within the scope of the invention as set forth in the appended claims.

In the drawings,

FIG. 1 is a perspective view of one form of the vehicle of this invention illustrating a rider poised in the operating position thereon.

FIG. 2 is a top plan view of the vehicle of FIG. 1, in slightly reduced scale.

FIG. 3 is a bottom plan view of the vehicle of FIG. 1, in slightly reduced scale.

FIG. 4 is a fragmentary front elevational view of a forward wheel assembly of the vehicle of FIG. 1, as seen generally from line 4—4 of FIG. 3 and on a scale enlarged relative thereto.

FIG. 5 is a sectional view of the wheel assembly of FIG. 4, as seen from line 5—5 of FIG. 4.

FIG. 6 is an enlarged fragmentary sectional view of a plate connector employed in the vehicle of FIG. 1, as seen from line 6—6 of FIG. 3.

FIG. 7A is an enlarged vertical sectional view of the base portion of the vehicle of FIG. 1, as seen from line 7—7 of FIG. 1, illustrating the relative positions of parts when the vehicle is travelling ahead prior to whirling.

FIG. 7B is similar to FIG. 7A, but illustrates the parts at the point of initiation of whirling motion.

FIG. 7C is similar to FIGS. 7A, 7B, but illustrates the parts during sustained whirling motion.

FIG. 8 is a perspective view of a second embodiment of the vehicle of this invention employing a unitary base.

FIG. 9 is an enlarged fragmentary side elevational view of the forward portion of the vehicle of FIG. 8, as seen from line 9—9 of FIG. 8, showing a wheel assembly in normal lowered position.

FIG. 10 illustrates the parts of FIG. 9, but with the wheel assembly in retracted position.

FIG. 11 illustrates an alternate spring loaded form of roller assembly usable on the various embodiments of the vehicle of this invention.

FIG. 12 is a top plan view of a further form of vehicle embodying the invention, incorporating hinge connectors.

FIG. 13 is a bottom plan view of an additional form of vehicle embodying this invention.

FIG. 14A is an enlarged elevational section view of the vehicle of FIG. 12 as seen from line 14—14 of FIG. 12, illustrating parts prior to initiation of whirling motion.

FIG. 14B is similar to FIG. 14A, but illustrates the parts at the point of initiation of whirling motion.

FIG. 14C is similar to FIGS. 14A, 14B, but illustrates the parts as they appear when the vehicle is sustaining whirling movement.

FIG. 15 is an enlarged fragmentary sectional view of a hinge connector of FIG. 12, as seen from line 15—15 of FIG. 12.

FIG. 16 is a side elevational view of a further form of the vehicle of this invention incorporating runners adapting the vehicle for operation on ice.

FIG. 17 is a bottom plan view of the vehicle of FIG. 16.

FIG. 18 is an enlarged fragmentary sectional view of a mounting assembly for enabling interchangeable mounting of runners and wheel assemblies.

FIG. 19 is an enlarged fragmentary sectional view of the front portion of a runner of FIG. 17, as seen from line 19—19 of FIG. 17.

FIG. 20 illustrates a brake assembly which may be utilized in conjunction with the various forms of vehicle embodying the invention.

FIG. 21 is a fragmentary view illustrating a modified form of plate connector.

In detail, referring to FIGS. 1, 2, and 3, a preferred embodiment of this invention includes a generally horiozntally disposed base portion 3, including a flat, circular footboard 4 supported on a plurality of roller assemblies 5, and connected by means of plate connectors 6 (FIGS. 3, 6) to a flat, outer ring 7, which is concentric with footboard 4 and normally disposed coplanar therewith. Ring 7 is supported on a plurality of wheel assemblies 8 (FIGS. 1, 3) and mounts the control means 9 (FIGS. 1, 2) which includes a handle bar 11 positioned so as to be conveniently manipulated by a rider, indicated at 2 in FIG. 1, standing in vehicle operating position on footboard 4.

Circular footboard 4 may be formed of any rigid sheet material, such as plywood or plastic, having sufficient strength to support the weight of the vehicle operator and one or more additional riders. The diameter of footboard 4 depends upon the intended use of the vheicle, i.e., the surface area of footboard 4 must be sufficient to provide standing room for the size of person and the number of persons expected to use the vehicle.

To the underside of footboard 4 are secured a plurality of four roller assemblies 5 (FIG. 3). Roller assemblies 5 are generally regularly spaced around the center of footboard 4, with the two forward assemblies being the same distance from the front end of footboard 4 and two rear assemblies being the same distance from the rear end thereof. Each roller assembly 5 is positioned the same distance from the center of footboard 4, approximately two-thirds of the way from the center to the periphery thereof. Roller assembly 5 may be in the form of a conventional caster having a mounting plate 12 (FIG. 3) for attaching the caster to the underside of footboard 4 with screws or otherwise. With wheel assemblies 5 positioned as described about the center of footboard 4, the footboard may be caused to rotate thereon about its central axis.

Plate connectors 6 are provided at the front and rear ends of footboard 4 for connecting the footboard to outer ring 7, and each connector 6 (FIG. 6) includes a plate 13 fixed at one end to the underside of footboard 4 at the outer edge portion 14 thereof by means of screws 15. Plate 13 extends across the gap between footboard 4 and ring 7 and along the underside of ring 7, and at the end thereof positioned under ring 7 is an aperture 16 for slidably receiving a pin 17 which is affixed to ring 7 and projects downwardly therefrom. To provide reinforced attachment for pin 17 an internally threaded cap 18 is press fitted into a aperture in ring 7, such cap being provided with a toothed exterior surface which effectively prevents the cap from being dislodged from ring 7. The upper threaded end 19 of pin 17 is screwed into cap 18, and the lower end 21 receives a smaller transversely extending pin 22 which projects from each side of pin 17 for preventing plate 13 from sliding past lower end 21 of pin 17. Aperture 16 is sufficiently large to permit play between such aperture and pin 17 so that ring 7 may be elevated relative to footboard 4 and also tilted relative thereto about a horizontal axis extending generally through the two plate connectors 6.

Outer ring 7 provides an annular base portion which surrounds footboard 4 and is spaced slightly from the footboard for permitting free relative motion between ring 7 and footboard 4. Ring 7 may be constructed of the same material as footboard 4 and has attached to its underside wheel assemblies 8 (FIGS. 3, 4, and 5). A plurality of four wheel assemblies 8 is provided, with two forward wheel assemblies positioned slightly ahead of the two forward roller assemblies 5, and two rear wheel assemblies slightly behind the rear roller assemblies 5 attached to footboard 4.

The two forward wheel assemblies 8 (FIGS. 4, 5) each include a pair of wheels 23, and are of such construction that when pressure is exerted on one wheel 23 of the pair, the wheels are permitted to tilt slightly in the vertical direction relative to ring 7, and when so tilted, are caused to turn in the horizontal direction. Forward wheel assemblies 8 include a mounting plate 24 (FIGS. 4, 5) which is fixed to ring 7 by screws 25. From plate 24 depend a pair of spaced parallel flanges 26 extending in a plane perpendicular to the axle 27 mounting wheels 23. A bracket member 28, of inverted U-shape cross-section extends between the lower end of flanges 26 and includes a rearwardly downwardly inclined web 29 and inclined front and rear flanges 32, 33. Received within bracket member 28 is an inclined channel member 34 having front and rear flanges 35, 36 and bottom web 37, generally parallel with web 29, to which web 37 axle 27 is fixed. A rearwardly downwardly inclined pin 38 extends through apertures in flanges 35, 36 of channel member 34 and flanges 32, 33 of bracket member 28, said apertures permitting rotation of pin 38 therein. The ends of pin 38 are enlarged for securing said pin in place. Within bracket member 28 and channel member 34 is a compressible insert 39. Insert 39 which may be of a resilient rubber material, is of such size as to substantially fill the space therein, and is grooved at its lower portion to receive pin 38. Axle 27 is normally maintained parallel to ring 7 by insert 39, but is permitted by said insert to pivot slightly within channel member 34 on pin 38. Because of the angular disposition of pin 38 vertical displacement of the axle and wheels 23 is accompanied by a slight turning of the wheels. The rear wheel assemblies 8 may be of similar construction as the front wheel assemblies and when so constructed, are mounted in reverse fashion to the forward wheel assemblies. However, the rear wheel assemblies need not turn in a horizontal direction and so may be of a simpler construction employing one or two wheels.

Ring 7 supports the hand operable vehicle control means 9 which includes a pair of upright lateral posts 41 (FIG. 1) respectively attached to ring 7 at points immediately rearwardly of front wheel assemblies 8. An upright forward post 42 is attached to ring 7 at the forward end thereof, curves rearwardly at its upper end portion, and is connected with posts 41 by a curved horizontally extending handle bar 43 (FIGS. 1, 2). Posts 41, 42 and bar 43 may be of rigid tubular construction. At each end of handle bar 43 is a handle grip 40, positioned to be conveniently grasped by an operator standing on footboard 4 and shaped for comfortable gripping, for controlling movement of the vehicle.

In operation, motion initially may be imparted to the vehicle by an operator grasping grips 40 and standing with one foot on footboard 4 and the other foot pushing along the ground, as with a conventional scooter. Alternatively motion may be imparted to the vehicle by running behind the vehicle while grasping the handle grips 40. When the desired velocity is attained the operator mounts footboard 4 and directs the vehicle in a straight line path by maintaining equal downward pressure on each handle grip 40, or causes the vehicle to turn in a desired direction by applying slight downward pressure on one or the other of handle grips 40, e.g., if it is desired to turn to the left, the left-hand handle grip is urged downwardly with slight downward pressure. When handle grip 40 is pressed downwardly ring 7 is tilted slightly relative to footboard 4 through post 41, being free to so tilt because of the play inherent in plate connectors 6. As ring 7 is tilted, the outermost wheel 23 of the wheel assembly 8 on the corresponding side of ring 7 is pressed downwardly with greater force than the inner wheel, and a slight vertical displacement of axle 27 occurs with resulting turning of wheels 23. When ring 7 is tilted, only one of the front wheel assemblies 8 is is contact with the ground.

When it is desired to initiate spinning or whirling motion, one or the other of the hand grips 40 is pushed sharply downwardly while the other hand grip is elevated, whereby the vehicle is thrown into a very abrupt turn. FIGS. 7A, 7B and 7C illustrate the parts at the bottom portion of the vehicle, with FIG. 7A illustrating the parts as they appear prior to whirling, FIG. 7B showing the parts at the initiation of whirling toward the right or clockwise direction in a plane perpendicular to the plane of the figure, and FIG. 7C illustrating the parts during whirling. In FIG. 7A, equal downward pressure is exerted on both hand grips 44 so that the vehicle is travelling in a straight line with the wheels of roller assemblies 5 and wheel assemblies 8 directed straight ahead and footboard 4 and ring 7 disposed horizontally and in coplanar relation. In FIG. 7B whirling is initiated when the right-hand hand grip 40 is urged downwardly and the left-hand hand grip 40 is elevated, causing ring 7 to tilt downwardly toward the right and the forward right-hand wheel assembly 8 to turn abruptly toward the right. Immediately after whirling is initiated both hand grips are elevated to their uppermost position bringing ring 7 to horizontally disposed elevated position, so that the vehicle is supported solely on roller assemblies 5 on which it spins about a vertical central axis. To terminate whirling, hand grips 40 and ring 7 are lowered until wheel assemblies 8 again contact the ground, braking whirling movement and permitting the vehicle to be directed in a straight or curved path as desired. During whirling it is necessary for the operator to maintain ring 7 substantially horizontal to prevent objectionable dragging of one or more wheel assemblies 8. Hand grips 40 provide support for the operator with which to maintain balance so that a natural tendency is to pull the hand grips toward the operator to counteract the cenrtifugal force of spinning rather than to move grips in the various positions for controlling the vehicle. Thus, it can be appreciated that proper manipulation of hand grips 40 during rapid whirling requires considerable coordination and balance and presents a challenge to the novice.

In FIG. 8 a modified form of this invention is illustrated, incorporating a unitary base 44, to the underside of which are attached roller assemblies 45 which are similar to roller assemblies 5 and are similarly positioned relative to each other and to the center of the vehicle. This form of vehicle includes four outer wheel assemblies 46 which correspond to wheel assemblies 8 and are similar in construction thereto, having plate 47 which corresponds to plate 24 of wheel assemblies 8. However, plate 47 is not attached to base 44, but instead each such plate 47 is fixed to the bottom end of a post 48 which extends upwardly through an aperture 51 (FIG. 9) formed in base 44 for receiving said posts. Post 48 is slidingly received in an upright tubular member 52 at the bottom end of which is an annular flange 53 which is attached to base 44 by screws 54. The fit between tubular member 52 and post 48 permits a slight amount of play between them. Post 48 is of a length to extend fully through tubular member 52 when wheel assembly 46 is positioned with plate 47 thereof displaced below the underside of base 44 approximately 1½ inch. The height of inner roller assemblies 45 is such that they are in contact with the ground when outer wheel assemblies 46 are in such extended position, as in FIG. 9. Fixed to the upper end of each post 48 is a horizontally disposed handle bar assembly 55 (FIG. 8) which includes a pair of slightly outwardly curved side bars 57 and a forwardly curved forward bar 63 extending between the front ends of side bars 57. Each side bar 57 is fixed adjacent its front end 58 to the upper end 49 of a forward post 52 and adjacent its rear end 59 to the upper end 49 of a rear post 48. The rear end 59 of each side bar extends slightly rearwardly of the rear post 52 and terminates in a rounded portion, and said side bar 57 is provided with a knurled or roughened surface extending substantially the full length thereof for better gripping by the operator. When wheel assemblies 46 are in the normal extended position with plate 47 thereof spaced from base 44, handle bar assembly 55 rests on the upper ends of the tubular member 52 which are formed thereat with an annular flange 56. Handle bar assembly 55 is positioned for convenient manipulation by the operator standing on base 44, to elevate and lower the handle bar assembly and wheel assemblies 46 therewith.

In operation, the vehicle of FIG. 8 initially may be propelled as described with respect to the vehicle of FIG. 1. The vehicle of FIG. 8 may be moved in a straight line path by an operator standing with his weight substantially evenly distributed on the four wheel assemblies 46 and the two side bars 57. To turn the vehicle the operator makes a slight shift of his weight in the desired direction, causing the appropriate wheel assembly 46 to turn. To cause an abrupt turn for intiating whirling, the operator shifts his weight and pushes down sharply on the appropriate side bar 57 while pulling on the other side bar 57, e.g., if it is desired to spin in the clockwise direction as seen in FIG. 8, the operator pushes downward on the right-hand side bar 57 and pulls up on the left-hand side bar. To sustain whirling, the operator pulls on both sides bars 57 for retracting wheel assemblies 46 (FIG. 10), so that base 44 is supported solely on roller assemblies 45 and is whirled on said roller assemblies about a central vertical axis. Whirling motion is terminated by lowering wheel assemblies 46 to the normal position with side bars 57. It is to be noted that the rear wheel assemblies 46 are provided only for support of base 44 to prevent scraping or dragging thereof and need not be capable of turning in a horizontal direction.

FIG. 11 illustrates a modified form of roller assembly 64, including a bracket 65 having an upper plate 66 which attaches to the inner base portion or footboard 67 of a vehicle by means of screws 68. Bracket 65 includes an intermediate web 71 and spaced, parallel lower web 72 having aligned apertures 73, 74 respectively, for receiving the vertical post 75 of a caster which includes a yoke 76 for mounting a caster wheel 77. Post 75 extends downwardly from an enlarged upper end 78, normally in contact with the upper side of web 71, through apertures 73, 74, and projects below lower web 72 to space the top of yoke 76 from the underside of bottom web 72 a distance of approximately 1 inch. Extending between web 72 and yoke 76, around posts 75, is a helical compression spring 79 which normally urges post 75 downwardly and is of such strength as to be only partially compressed when one or more riders are on base member 67. A vehicle equipped with roller assemblies 64 provides a bouncing ride during whirling.

FIG. 12 illustrates a modification of the vehicle, having a circular base portion including a footboard 82 and a pair of segmental shaped side boards 83 connected to footboard 82 by hinges 84. To the underside of footboard 82 are attached four roller assemblies 85 corresponding to the above-described roller assemblies 5, and to the underside of side boards 83 are attached outer wheel assemblies 86 corresponding to wheel assemblies 8. Mounted in upright fashion on each side board 83 are a pair of posts 87 (FIGS. 12, 14A), having a bottom annular flange 88 which is screwed to side board 83. The forward posts 87 are attached adjacent the point of attachment of the forward wheel assemblies 86 and the rear posts 87 are attached adjacent the point of attachment of the rear wheel assemblies 86. Between the upper ends of the posts 87 on a side board 83, in convenient position for grasping by an operator, extends of horizontal handle bar 91 which may have a knurled or roughened surface.

Hinge 84 connecting footboard 82 and side board 83 is attached with its hinge pin 92 uppermost (FIG. 15) and the hinge plates 93 attached to the opposed side edges 94, 95 of footboard 82 and side board 83, respectively. Edges 94, 95 are beveled so that said edges diverge in the downward direction. With such hinge construction side boards 83 are enabled to be pivoted downwardly a slight amount about hinge pin 92 from coplanar relation with footboard 82, until hinge plates 93 are brought together, and side boards 83 are also pivotable upwardly for elevating wheel assemblies 86 thereof from the ground.

FIG. 14A illustrates the base portions of the vehicle of FIG. 12 as they appear when the vehicle is travelling in a straight line path. Footboard 82 and side boards 83 are in coplanar relation, and roller assemblies 85 and outer wheel assemblies 86 are disposed with the wheels thereof oriented straight ahead. To initiate whirling, for example, in the clockwise direction in a plane perpendicular to the plane of FIG. 14B, the right-hand handle bar 91 (FIG. 12) is sharply pushed downwardly by the operator, causing the right-hand side board 83 to pivot slightly downwardly (FIG. 14B) and the forward wheel assembly 86 to turn toward the right. At the same time, the left-hand handle bar 91 is elevated, causing the left-hand side board 83 to be pivoted upwardly and the left-hand wheel assembly 86 to be elevated from contact with the ground. Immediately thereafter the right-hand handle bar 91 is elevated (FIG. 14C) causing the right-hand side board 83 to be pivoted upwardly to cause the right-hand wheel assemblies 86 to be elevated, so that the vehicle is supported solely on roller assemblies 85 for rotating on said assemblies about a vertical central axis. To terminate whirling, handle bars 91 are lowered for bringing wheel assemblies 86 into contact with the ground.

Another form of the vehicle is illustrated in FIG. 13 and includes a footboard 96 and side boards 97 which together form a vehicle base portion having a mildly curved forward end 98 and sharply rounded rear end 99. Attached to the underside of footboard 96 are four roller assemblies 102 corresponding to roller assemblies 5 of FIG. 5, and attached to the underside of side board 97 the same distance rearwardly of forward end 98 as the forward roller assemblies 102 are wheel assemblies 103 similar to the forward wheel assemblies 8 of FIG. 4. Each side board 97 is connected to footboard 96 by a spaced pair of plate connectors 104 which are similar in construction to plate connectors 6 of FIG. 6 and which are constructed to have sufficient play between the plates 105 and pins 106 thereof as to permit side boards 97 to be elevated from footboard 96 and also to be tilted upwardly relative to said footboard. Side boards 97 function in the same manner as ring 7 of FIG. 1 and are appropriately manipulated to manuever the vehicle through control means 107 (FIG. 13) which is similar to control means 9 of FIG. 1 but does not include a forward post.

FIG. 21 illustrates a portion of the underside of a vehicle similar to that of FIG. 1, but utilizing modified plate connectors 143 corresponding to plate connectors 6 of FIG. 1, for connecting footboard 144 and outer ring 145. The plate 146 of connector 143 includes an arcuate slot 147 for receiving the pin 148 depending from ring 145. Arcuate slot 147 permits a slight amount of relative rotary movement between footboard 144 and ring 145, and specifically, it has been found desirable to employ a slot that allows pin 148 to be displaced approximately two inches.

The vehicle utilizing plate connectors 143 is caused to whirl by initially elevating ring 145, and while the ring is elevated, turning it in a horizontal direction to the extent permitted by connectors 143, and then sharply lowering it. When the wheel assemblies on ring 145 engage the ground they are turned slightly to one side so that the vehicle turns abruptly, and whirling is sustained by again elevating ring 145. The wheel assemblies of this form of vehicle need not incorporate the turning feature of wheel assemblies 8, to initiate whirling.

To adapt the vehicle of this invention for operation on ice, runners 108 (FIGS. 16, 17 and 19) may be utilized in place of outer wheel assemblies. A vehicle utilizing runner 108 is in most respects similar to the vehicle of FIG. 1, having a footboard 111 (FIG. 17) outer ring 112, roller assemblies 113, plate connectors 114 and control means 115, all corresponding to similar parts of the vehicle of FIG. 1. In this form of vehicle it has been found advantageous to utilize a conventional ball-type caster as the roller assembly 113, instead of a wheel caster. Such caster is manufactured by Shepherd Casters, Inc. of Benton Harbor, Mich., under the Shepherd trademark.

One runner 108 is attached to the underside of ring 112 at each lateral side thereof and each includes upturned front and rear ends 116, 117, respectively (FIG. 16). Adjacent each end 116, 117 is fixed an upright stud 118 attached at its upper end to ring 12. Stud 118 may be permanently bolted to ring 112 or removably attached so that runner 108 can be interchanged with a wheel assembly. For removable attachment to ring 112 (FIG. 18) stud 118 is provided with a threaded upper end portion 119 and an annular flange 120 adjacent said end portion 119. Stud 118 is passed through an aperture 121 in ring 112 until flange 120 engages the underside thereof. In such position end portion 119 projects slightly above ring 112, and a dome nut 123 is screwed thereon and tightened against a washer 122 for securing stud 118 in place. As desired, runners 108 may be removed from the vehicle and wheel assembly 8 attached, it being necessary only to modify a wheel assembly 8 by provision of a threaded mounting stud on the plate 24 thereof. Upturned front end 116 (FIG. 19) of runner 108 is provided with a series of transversely extending alternating grooves 141 and jagged ridges 142. Because ridges 142 are on the curved portion of runner 108 they are normally elevated from contact with the ice surface so as not to impede sliding of the runner, but when front end 116 is pressed against the ice, ridges 142 cut into and grip said surface.

In operation, the ice vehicle of FIGS. 16, 17 is maneuvered in the same manner as the vehicle of FIG. 1. As with the wheeled vehicle, whirling is initiated by sharply pushing down on one or the other handle grip. By such action ridges 142 of a runner 108 are caused to bite into the ice surface producing an abrupt turn toward the side of the engaged runner. Immediately thereafter, runners 108 are elevated by raising the handle grips, and the vehicle is supported solely on roller assemblies 113 for sustained whirling. Runners 108 are lowered into engagement with the ice surface when it is desired to terminate whirling.

The various wheeled vehicles of this invention may be made to initiate whirling by abruptly braking one forward wheel. For example, the vehicle of FIG. 8 may be modified to include a single wheeled assembly 124 (FIG. 20) instead of wheel assembly 46. Wheel assembly 124 is attached to a post 125 which is received in a tubular member 126, and may be elevated and lowered similarly to wheel assembly 46. A foot operated brake assembly 131 is provided for each forward wheel assembly 124 including a brake shoe 132 having a concave friction surface 129 for engaging the lower portion of the wheel of assembly 124. Brake shoe 132 is attached to the lower end of an upwardly extending brake arm 133 for receiving a pivot pin 135 which is mounted in bearings 136 on the underside of the vehicle footboard 130. Extending generally rearwardly from boss portion 134 is brake pedal 137 having a shallow cavity 138 at the underside of the rear end thereof, which is in vertical alignment with a depression 139 formed on the upper side of footboard 130. Extending between cavity 138 of pedal 137 and depression 139, and attached at the ends respectively to said brake pedal and footboard 130 is a helical compression spring 140 which normally urges brake pedal 137 upwardly a slight distance from footboard 130 and positions brake shoe 132 a similar distance from the wheel of wheel assembly 124. To engage a wheel of wheel assembly 124 with the brake shoe, the operator merely depresses brake pedal 137 with his foot. Since the brake shoe engages the wheel of wheel assembly 124 at the lower surface of such wheel the wheel assembly may be elevated as desired by the operator although the brake pedal is maintained in the depressed position.

In summary the above-described rotatable vehicles include a vehicle base, a portion of which carries the vehicle operator. The vehicle base is supported for movement along the ground and for rotation about a central axis. Wheel assemblies, runners or other means are provided as guide elements or assemblies for guiding the vehicle along the vehicle supporting surface, which may be an ice surface or other surface. Control means on the vehicle are operable by the vehicle operator, while the vehicle is moving, to initiate, sustain, and, finally, terminate rotation of the vehicle base to obtain a whirling ride.

It is to be understood that the claims appended hereto are intended to cover all changes and modifications of the examples herein chosen for purposes of disclosure which do not depart from the spirit and scope of the invention. For example a variation of the vehicle, adapted for giving a controlled whirling ride on snow, may utilize a saucer shaped base instead of the above-described footboard. In another modification a low speed motor may be utilized to eliminate the necessity for initial pushing by the operator.

We claim:
1. A rotatable vehicle, comprising:
(a) a vehicle base;
(b) support means supporting said base for movement along a vehicle supporting surface and for rotation about a generally vertical axis;
(c) a portion of said vehicle base adapted for carrying a vehicle operator;
(d) control means operable by said vehicle operator on said portion of said base while said base is moving along said vehicle supporting surface for causing said portion with said operator to rotate about a generally vertical axis;
(e) guide elements under said base for guiding said vehicle during movement along said vehicle supporting surface;
(f) said guide elements being positionable in elevated relation to said vehicle supporting surface; and
(g) said control means being operable by said vehicle operator for positioning said guide elements in elevated relation to said vehicle supporting surface during such rotation.

2. The vehicle of claim 1, wherein:
(h) said control means is operable by said vehicle operator to lower said guide elements for terminating such rotation.

3. The vehicle of claim 1, wherein:
(h) at least one of said guide elements is at each lateral side of the center of said base; and
(i) said control means is operable by said vehicle operator to urge a guide element at one lateral side of the center of said base downwardly against said vehicle supporting surface for initiating such rotation of said base portion.

4. A rotatable vehicle, comprising:

(a) a generally horizontally disposed base;
(b) said base including a footboard portion for supporting a vehicle operator;
(c) at least one pair of roller assemblies secured to the underside of said footboard portion for supporting said base for movement along a vehicle supporting surface and for rotation on said surface about a generally vertical central axis;
(d) at least one vehicle guide assembly at the underside of said base at each lateral side of said footboard portion for guiding said base during such movement along said vehicle supporting surface;
(e) each said guide assembly being mounted for vertical movement relative to said footboard portion;
(f) vehicle control means connected to said base and operable by said vehicle operator on said footboard portion;
(g) said vehicle control means being operatively connected to each said guide assembly; and
(h) said vehicle control means being operable by said vehicle operator to urge at least one said guide assembly downwardly against said vehicle supporting surface during such movement therealong for initiating such rotation of said base.

5. The vehicle of claim 4, wherein:
(i) said control means is operable to move said guide assemblies upwardly relative to said footboard portion to a position elevated from said vehicle supporting surface whereby said base is supported only on said roller assemblies for rotation thereon about a generally vertical central axis.

6. The vehicle of claim 5, wherein:
(j) said footboard portion comprises a circular platform;
(k) said base includes an annular portion connected to said circular platform concentric and normally disposed coplanar therewith;
(l) said annular portion is vertically movable relative to said circular platform; and
(m) said control means and guide assemblies are secured to said annular portion.

7. The vehicle of claim 6, wherein:
(n) said annular portion is pivotable relative to said circular platform about a generally horizontal axis.

8. The vehicle of claim 6, wherein:
(n) said circular platform and said annular portion are connected for relative angular displacement about a central generally vertical axis.

9. The vehicle of claim 5, wherein:
(j) said guide assembly is secured to said base at the peripheral portion thereof;
(k) said peripheral portion is integral with said footboard portion of said base; and
(l) said guide assembly is vertically movable relative to said peripheral portion of said base.

10. The vehicle of claim 5, wherein:
(j) said guide assembly is adapted for sliding on an ice surface for guiding said vehicle therealong.

11. The vehicle of claim 10, wherein:
(k) said guide assembly comprises a runner.

12. The vehicle of claim 11, including:
(l) upturned portions at each end of said runner; and
(m) a series of alternating grooves and ridges extending transversely across said upturned portion at the front end of said runners.

13. In a vehicle having a generally horizontally disposed base, a portion of said base providing a footboard, a separate base portion connected to said footboard normally in coplanar relation therewith but vertically movable relative thereto, roller assemblies secured to the underside of said footboard and vehicle guide assemblies at the underside of said separate portion of said base, means connecting said footboard and said separate portion of said base, comprising:

(a) a rigid plate fixed to the underside of said footboard at a peripheral portion thereof;
(b) a portion of said plate projecting from said footboard and along the underside of said separate base portion;
(c) said projecting portion of said plate having an aperture therein;
(d) a member depending from the underside of said separate base portion and projecting through said aperture, having an enlargement at its lower end for retaining said member within said aperture, said member being vertically slidable within said aperture.

References Cited

UNITED STATES PATENTS

| | | | |
|---|---|---|---|
| 1,534,978 | 4/1925 | De Waltoff et al. | 272—35 |
| 3,339,939 | 9/1967 | Bowers | 280—87.01 |

LEO FRIAGLIA, *Primary Examiner.*

R. R. SONG, *Assistant Examiner.*

U.S. Cl. X.R.

280—87.04